United States Patent
Patry et al.

(10) Patent No.: US 10,677,170 B2
(45) Date of Patent: Jun. 9, 2020

(54) APPARATUS AND METHOD FOR DETECTING A THRESHOLD VIBRATION CONDITION IN A GAS TURBINE ENGINE

(71) Applicant: Pratt & Whitney Canada Corp., Longueuil (CA)

(72) Inventors: Benoit Patry, St-Basile-le-Grand (CA); Alexandre Bosse, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 759 days.

(21) Appl. No.: 15/229,516

(22) Filed: Aug. 5, 2016

(65) Prior Publication Data

US 2018/0038284 A1 Feb. 8, 2018

(51) Int. Cl.
*F02C 3/04* (2006.01)
*F02C 9/00* (2006.01)

(52) U.S. Cl.
CPC .................. *F02C 9/00* (2013.01); *F02C 3/04* (2013.01); *F05D 2260/80* (2013.01);
(Continued)

(58) Field of Classification Search
CPC ............ G05B 19/0423; G05B 19/0425; G05B 19/00; G01H 17/00; G01M 15/12;
(Continued)

(56) References Cited

U.S. PATENT DOCUMENTS 3,803,425 A * 4/1974 Carp ....................... B60T 8/885
303/122.07
3,893,108 A * 7/1975 McBride, Jr. .......... B60K 28/00
123/198 D
(Continued)

FOREIGN PATENT DOCUMENTS

GB 2248110 A 3/1992

OTHER PUBLICATIONS

GE Measurement & Control, 3500 Series Machinery Protection System Bently Nevada Asset Condition Monitoring brochure, 2015. (Year: 2015).*
(Continued)

*Primary Examiner* — Gerald L Sung
*Assistant Examiner* — Alyson Joan Harrington
(74) *Attorney, Agent, or Firm* — Norton Rose Fulbright Canada LLP

(57) ABSTRACT

An apparatus and a method for detecting a threshold vibration condition associated with the operation of a gas turbine engine are disclosed. The apparatus includes a vibration-sensitive trigger mounted to the gas turbine engine for monitoring engine vibration and configured to disturb a sensor signal when a threshold vibration condition is met. The method includes generating one or more sensor signals associated with an operating parameter of the gas turbine engine and providing the one or more sensor signals to a controller of the gas turbine engine; disturbing the one or more sensor signals provided to the controller in response to the threshold vibration condition being met; and detecting the disturbance in the one or more sensor signals provided to the controller and generating one or more output signals indicative of the detected disturbance.

18 Claims, 3 Drawing Sheets

(52) U.S. Cl.
CPC .... *F05D 2260/96* (2013.01); *F05D 2270/304* (2013.01); *F05D 2270/334* (2013.01)

(58) Field of Classification Search
CPC ........ G01M 1/14; G01M 1/22; G01M 13/028; G01M 13/045; G01N 29/4409; G01N 29/4427; F02C 9/00; F02C 9/28; F05D 2260/80; F05D 2260/96; Y10T 307/453; Y10T 307/74; H01H 2300/03
See application file for complete search history.

(56) References Cited

U.S. PATENT DOCUMENTS

| | | | | |
|---|---|---|---|---|
| 3,978,659 | A * | 9/1976 | Smith ........................ | F02C 9/00 60/39.281 |
| 6,768,938 | B2 * | 7/2004 | McBrien ................ | G01H 1/006 701/100 |
| 7,013,210 | B2 * | 3/2006 | McBrien ................ | G01H 1/006 340/439 |
| 7,355,828 | B2 * | 4/2008 | Jones ........................ | G05B 9/03 290/40 A |
| 8,082,115 | B2 * | 12/2011 | Bechhoefer ............. | F03D 7/047 702/34 |
| 8,720,275 | B2 * | 5/2014 | Heda ..................... | G01H 1/006 73/593 |
| 9,002,617 | B2 * | 4/2015 | Tanriverdi ............. | G05B 17/02 701/100 |
| 9,024,712 | B2 | 5/2015 | Zusman | |
| 9,127,597 | B2 * | 9/2015 | Masiello ................... | F02C 9/28 |
| 9,134,198 | B2 * | 9/2015 | Djelassi ................... | F01D 17/02 |
| 9,406,174 | B2 * | 8/2016 | Tart .......................... | G07C 3/00 |
| 9,476,361 | B2 * | 10/2016 | Morgan .................... | F02C 9/28 |
| 9,574,570 | B2 * | 2/2017 | Lillis ....................... | F01D 17/06 |
| 9,599,018 | B2 * | 3/2017 | Belzner ................... | F01D 21/14 |
| 9,696,697 | B2 * | 7/2017 | Saraswat ................. | G05B 15/02 |
| 9,752,960 | B2 * | 9/2017 | Angello ................. | F01D 21/003 |
| 9,816,485 | B2 * | 11/2017 | Wong .................... | F03D 7/0296 |
| 9,932,852 | B2 * | 4/2018 | Lu ........................... | F01D 21/00 |
| 10,054,004 | B2 * | 8/2018 | Revak .................... | F01D 21/003 |
| 10,190,440 | B2 * | 1/2019 | Argote .................... | F01D 21/14 |
| 2004/0176902 | A1 * | 9/2004 | McBrien ................ | G01H 1/006 701/100 |
| 2007/0013365 | A1 * | 1/2007 | Jones ........................ | G05B 9/03 324/160 |
| 2011/0125419 | A1 * | 5/2011 | Bechhoefer ............. | F03D 7/047 702/34 |
| 2011/0142634 | A1 * | 6/2011 | Menke .................. | F03D 7/0224 416/46 |
| 2012/0107094 | A1 * | 5/2012 | Lillis ....................... | F01D 17/06 415/118 |
| 2012/0133135 | A1 * | 5/2012 | Su .......................... | F03D 7/0264 290/44 |
| 2013/0041622 | A1 * | 2/2013 | Lu ........................... | F01D 21/00 702/151 |
| 2013/0079955 | A1 * | 3/2013 | Masiello ................... | F02C 9/28 701/3 |
| 2013/0167649 | A1 * | 7/2013 | Heda ....................... | G01H 1/006 73/660 |
| 2013/0186191 | A1 * | 7/2013 | Djelassi ................... | F01D 17/02 73/112.06 |
| 2014/0042746 | A1 * | 2/2014 | Wong .................... | F03D 7/0296 290/44 |
| 2015/0007574 | A1 * | 1/2015 | Morgan .................... | F02C 9/28 60/772 |
| 2015/0013343 | A1 * | 1/2015 | Belzner ................... | F01D 21/14 60/779 |
| 2015/0019104 | A1 * | 1/2015 | Tanriverdi ................ | F02C 9/00 701/100 |
| 2015/0051847 | A1 * | 2/2015 | Angello ................. | F01D 21/003 702/35 |
| 2015/0066223 | A1 * | 3/2015 | Saraswat ................. | G05B 15/02 700/287 |
| 2015/0066430 | A1 * | 3/2015 | Priori ................. | G05B 23/0235 702/179 |
| 2015/0204211 | A1 * | 7/2015 | Revak .................... | F01D 21/003 702/33 |
| 2015/0325060 | A1 * | 11/2015 | Tart .......................... | G07C 3/00 340/679 |
| 2016/0363001 | A1 * | 12/2016 | Argote .................... | F01D 21/04 |

OTHER PUBLICATIONS

Wikipedia.org—Switch, Jun. 9, 2016; taken from Wikipedia Switch: Revision history. (Year: 2016).*
Honeywell, Onboard Vibration Monitoring System/HUMS, Oct. 2014, 2014 Honeywell International Inc.
Honeywell, Health and Usage Monitoring, 2016, 2016 Honeywell International Inc., https://aerospace.honeywell.com/en/product-listing/health-and-usage-monitoring, accessed on Apr. 22, 2016.
PCB Piezotronics, PCB Model 686B02, 2016, PCB Group, Inc., https://www.pcb.com/products.aspx?m=686B02, accessed on Apr. 22, 2016.
PCB Piezotronics Inc., Model 686B02 Vibration Switch Installation and Operating Manual, pp. 1-38, accessed online on Apr. 21, 2016.
Canadian Intellectual Property Office, Office Action dated May 28, 2018 re: application No. 2,965,066.
Norton Rose Fulbright Canada LLP, Response to Office Action dated May 28, 2018 re: application No. 2,965,066.

* cited by examiner

APPARATUS AND METHOD FOR DETECTING A THRESHOLD VIBRATION CONDITION IN A GAS TURBINE ENGINE

TECHNICAL FIELD

The disclosure relates generally to condition monitoring, and more particularly to detecting a threshold condition such as a threshold vibration condition in a gas turbine engine.

BACKGROUND OF THE ART

There exists vibration monitoring equipment that can be installed on gas turbine engines. For example, there are known health and usage monitoring systems (HUMS) that can conduct vibration monitoring on gas turbine engines. Some existing HUMS can provide very detailed and trending information about vibration of a gas turbine engine. However, existing HUMS can be relatively complex and expensive.

SUMMARY

In one aspect, the disclosure describes a gas turbine engine comprising:
a compressor for pressurizing air;
a combustor in which the compressed air is mixed with fuel and ignited for generating a stream of combustion gases;
a turbine for extracting energy from the combustion gases;
a controller of the gas turbine engine;
a sensor operatively coupled to the controller to provide to the controller a sensor signal associated with a parameter of the gas turbine engine; and
a vibration-sensitive trigger mounted to the engine for monitoring engine vibration and configured to disturb the sensor signal when a threshold vibration condition is met;
the controller configured to detect the disturbance in the sensor signal and generate one or more output signals indicative of the detected disturbance.

The disturbance may comprise a detectible anomaly introduced into a speed sensor signal provided to the controller.

The disturbance may comprise an interruption of a speed sensor signal provided to the controller.

The vibration-sensitive trigger may be configured to cause a temporary disturbance of the sensor signal when a threshold vibration condition is met.

The controller may be configured to generate an output signal in response to the disturbance indicating an apparent failure of the sensor.

The sensor may be a speed sensor and the parameter may comprise a rotational speed of an engine shaft.

The vibration-sensitive trigger may comprise a vibration switch connected in series with the sensor.

Embodiments may include combinations of the above features.

In another aspect, the disclosure may describe an apparatus for detecting a threshold condition associated with the operation of a gas turbine engine. The apparatus comprises:
a controller of the gas turbine engine;
a sensor operatively coupled to the controller to provide one or more sensor signals associated with an operating parameter of the gas turbine engine to the controller; and
a condition-sensitive trigger configured to disturb the one or more sensor signals provided to the controller in response to the threshold condition being met;
the controller being configured to detect the disturbance in the one or more sensor signals and generate one or more output signals indicative of the detected disturbance.

The condition-sensitive trigger may be a vibration-sensitive trigger.

The disturbance may comprise an interruption of the one or more sensor signals provided to the controller.

The disturbance may be indicative of an apparent failure of the sensor.

The operating parameter may comprise an operating speed associated with the gas turbine engine.

The condition-sensitive trigger comprises a normally-closed switch connected in series with the sensor.

The sensor may be part of a sensing circuit and the condition-sensitive trigger may be configured to cause an open-circuit condition in the sensing circuit.

The condition-sensitive trigger may comprise a vibration switch.

The sensor may comprise a speed sensor and the condition-sensitive trigger may comprise a vibration switch connected in series with the speed sensor.

Embodiments may include combinations of the above features.

In another aspect, the disclosure describes a method for detecting a threshold condition associated with the operation of a gas turbine engine. The method comprises:
generating one or more sensor signals associated with an operating parameter of the gas turbine engine and providing the one or more sensor signals to a controller of the gas turbine engine;
disturbing the one or more sensor signals provided to the controller in response to the threshold condition being met; and
detecting the disturbance in the one or more sensor signals provided to the controller and generating one or more output signals indicative of the detected disturbance.

The threshold condition may be a threshold vibration condition.

The operating parameter may comprise an operating speed associated with the gas turbine engine.

The disturbance may comprise an apparent failure of the sensor.

The disturbance may comprise an interruption of the one or more sensor signals provided to the controller.

Embodiments may include combinations of the above features.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

The present disclosure relates to apparatus and methods for condition monitoring in gas turbine engines or other mechanical systems. In some embodiments, the apparatus and methods disclosed herein may have simpler constructions and may be more economical than some health and usage monitoring systems (HUMS). In some embodiments, the apparatus disclosed herein may be incorporated into new gas turbine engines or may be particularly well-suited for retrofitting into existing gas turbine engines because of their simplicity and use of existing wiring. In various embodiments, the disclosed apparatus and methods may be configured to detect a threshold vibration or other condition having been met and warn an operator (e.g., pilot) that an action (e.g., shut down of the engine) is required.

In some embodiments, the apparatus and methods disclosed herein include the use of a vibration or other switch connected in series with a (e.g., speed) sensor. For example, when a predetermined threshold vibration condition associated with the operation of the gas turbine engine is sensed by the vibration switch, a relay causes a switch to open and disable the sensor which is connected to a suitable detector such as an electronic engine controller of the engine. This causes the controller to detect an apparent failure of the sensor and output a fault/warning message indicative of the sensor failure and that can also be indicative of the threshold vibration condition having been met. In other words, vibration monitoring as disclosed herein may be considered as being "silent" because a threshold vibration condition can be detected but disguised as an apparent sensor failure. This way, the same existing wiring and logic used to detect a failure of the sensor can also be used to detect a threshold vibration condition.

Aspects of various embodiments are described through reference to the drawings.

Figure 1:
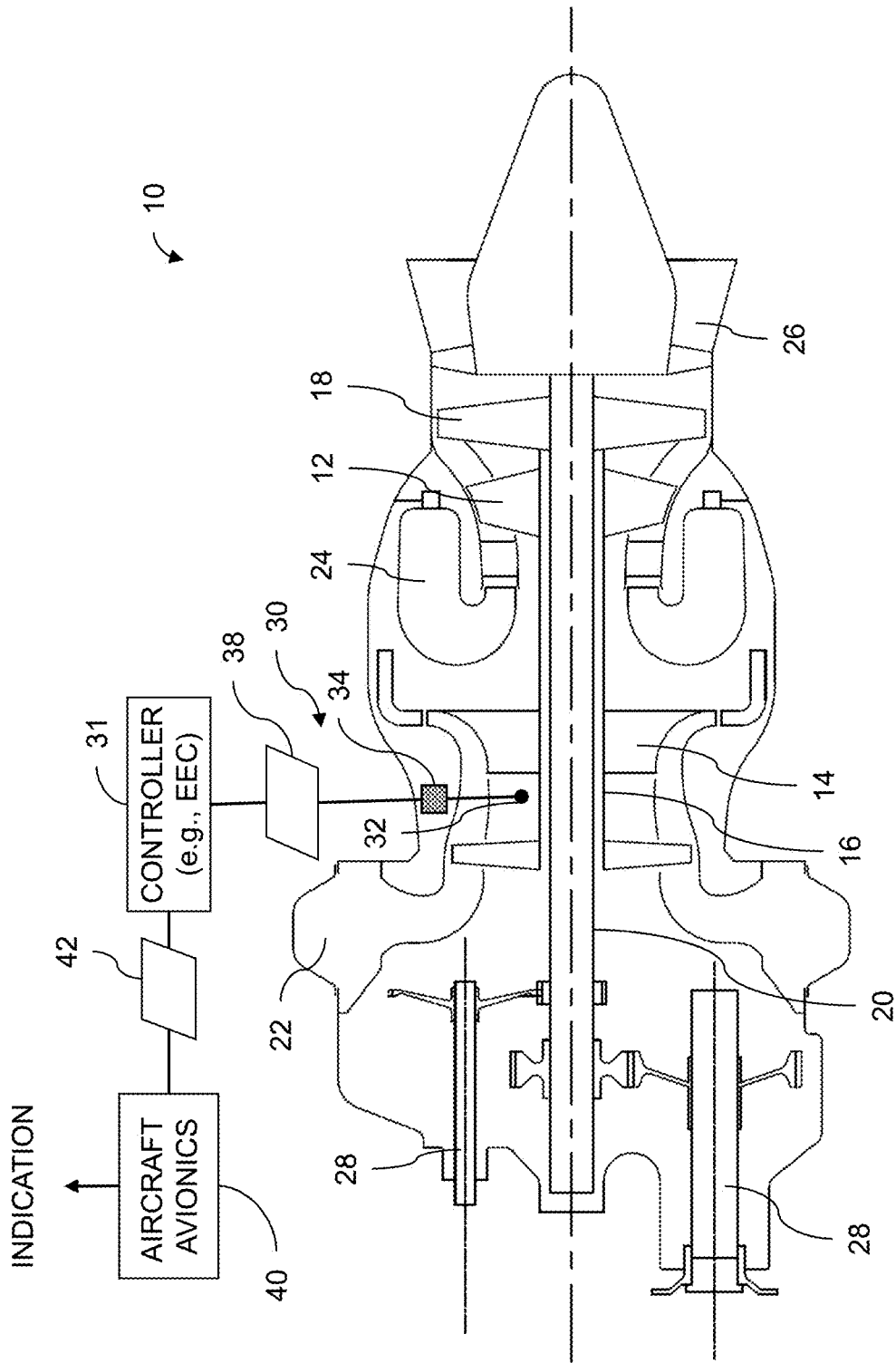
FIG. 1 shows a schematic axial cross-section view of an exemplary gas turbine engine comprising an apparatus for detecting a threshold condition as disclosed herein.

FIG. 1 is a schematic exemplary representation of an axial cross-section view a gas turbine engine 10. Even though the following description and FIG. 1 specifically refer to a gas turbine engine of the turboshaft type as an example, it is understood that aspects of the present disclosure may be equally applicable to other types of gas turbine engines including turboprop and turbofan gas turbine engines. Turbine engine 10 may be of a type provided for use onboard aircraft for propulsion of aircraft (e.g., by driving a propeller) or for coupling to one or more loads such as, for example, an electric generator. In some embodiments, turbine engine 10 may be configured for use as an auxiliary power unit (APU) onboard an aircraft. It is also understood that aspects of the present disclosure are also applicable to condition (e.g., vibration) monitoring of mechanical systems other than gas turbine engines.

Even though the following description specifically refers to detecting a threshold vibration condition as an example, it is understood that aspects of the present disclosure are also suitable for detecting other types of threshold conditions such as threshold temperatures, pressures, displacements and speeds for example.

Turbine engine 10 may comprise a first spool comprising high pressure turbine 12, high pressure compressor 14 and high pressure shaft 16, and, a second spool comprising low pressure power turbine 18 mounted to power turbine shaft 20. Compressor 14 may draw ambient air into engine 10 via air inlet 22, increase the pressure of the drawn air and deliver the pressurized air to combustor 24 where the pressurized air is mixed with fuel and ignited for generating an annular stream of hot combustion gas(es) (referred hereinafter in the singular). High pressure turbine 12 may extract energy from the hot expanding combustion gas and thereby drive high pressure compressor 14. The hot combustion gas leaving high pressure turbine 12 may be accelerated as it further expands, and drives power turbine 18. The combustion gas may then exit turbine engine 10 via exhaust outlet 26. Power turbine shaft 20 may be coupled to drive one or more loads directly or, for example, indirectly via one or more output shafts 28 drivingly engaged to power turbine shaft 20.

Turbine engine 10 may comprise apparatus 30 for detecting a threshold (e.g., vibration) condition associated with the operation of turbine engine 10. Apparatus 30 may comprise: controller 31 of turbine engine 10; sensor 32 operatively coupled to controller 31 to provide one or more sensor signals 38 associated with an (e.g., operating or environmental) parameter of turbine engine 10 to controller 31; and vibration-sensitive trigger 34 configured to disturb the one or more sensor signals 38 provided to controller 31 in response to the threshold vibration condition being met. Controller 31 may be configured to detect the disturbance in the one or more sensor signals 38 and generate one or more output signals 42 indicative of the detected disturbance.

Sensor 32 may be any type of sensor that is suitable for monitoring an operating or environmental parameter of turbine engine 10. In some embodiments, sensor 32 may be of a type suitable for monitoring a parameter of turbine engine 10 other than engine vibration. For example, sensor 32 may comprise a speed sensor, temperature sensor or a pressure sensor (located at a suitable location in or adjacent the engine). In some embodiments, sensor 32 may be a speed sensor for monitoring the rotational speed of either the first spool comprising high pressure turbine 12 and compressor 14, or, for monitoring the rotational speed of the second spool comprising low pressure turbine 18. For example, sensor 32 may be of the type suitable for measuring the rotational speed (e.g., N1) of power turbine shaft 20 or for measuring the rotational speed (e.g., N2) of high pressure shaft 16. Sensor 32 may be operatively coupled to provide one or more signals 38 (referred hereinafter as "sensor signal 38") representative of the monitored parameter (e.g., engine speed) to controller 31 via a wired connection for example. Sensor signal 38 may be provided to controller 31 substantially continuously or intermittently for the purpose of monitoring the parameter.

In various embodiments, controller 31 may include or form part of a Full Authority Digital Engine Control (FADEC) which may, for example, comprise one or more digital computers or other data processors, sometimes referred to as electronic engine controller(s) (EEC) and related accessories that control at least some aspect of performance of engine 10. For example, controller 31 may comprise an EEC that is configured to take part in the monitoring of the operating parameter and, optionally, also carry out other functions. For example, such EEC may, for example, be configured to make decisions regarding the control of turbine engine 10 until a pilot wishes to or is required to intervene. The EEC may be configured to maintain an efficient operation of turbine engine 10 for a given flight condition. As a data processor, controller 31 may include one or more microcontrollers or other suitably programmed or programmable logic circuits. Controller 31 may comprise one or more storage means (e.g. devices, memories) suitable for retrievably storing executable machine-readable instructions for controlling the operation of controller 31. Such storage means may include tangible, non-transitory memory(ies).

Controller 31 may be operatively coupled to aircraft avionics 40 via a wired or other suitable connection for communication therewith. For example, based on received sensor signal 38, controller 31 may be configured to provide one or more output signals 42 (referred hereinafter in the singular) to aircraft avionics 40. For example, controller 31 may continuously or intermittently report the monitored value of the parameter so that, for example, a suitable indication may be provided to a pilot in the cockpit of the aircraft to which turbine engine 10 may be mounted. In some embodiments, controller 31 may be configured to detect a disturbance (e.g., malfunction associated) with the monitoring of the parameter. For example, controller 31 may be configured to detect a failure of sensor 32 and provide appropriate notification to aircraft avionics 40 via output signal 42 for example. As explained below, this same functionality of controller 31 may be used to also detect a threshold vibration condition having been met.

Figure 2:
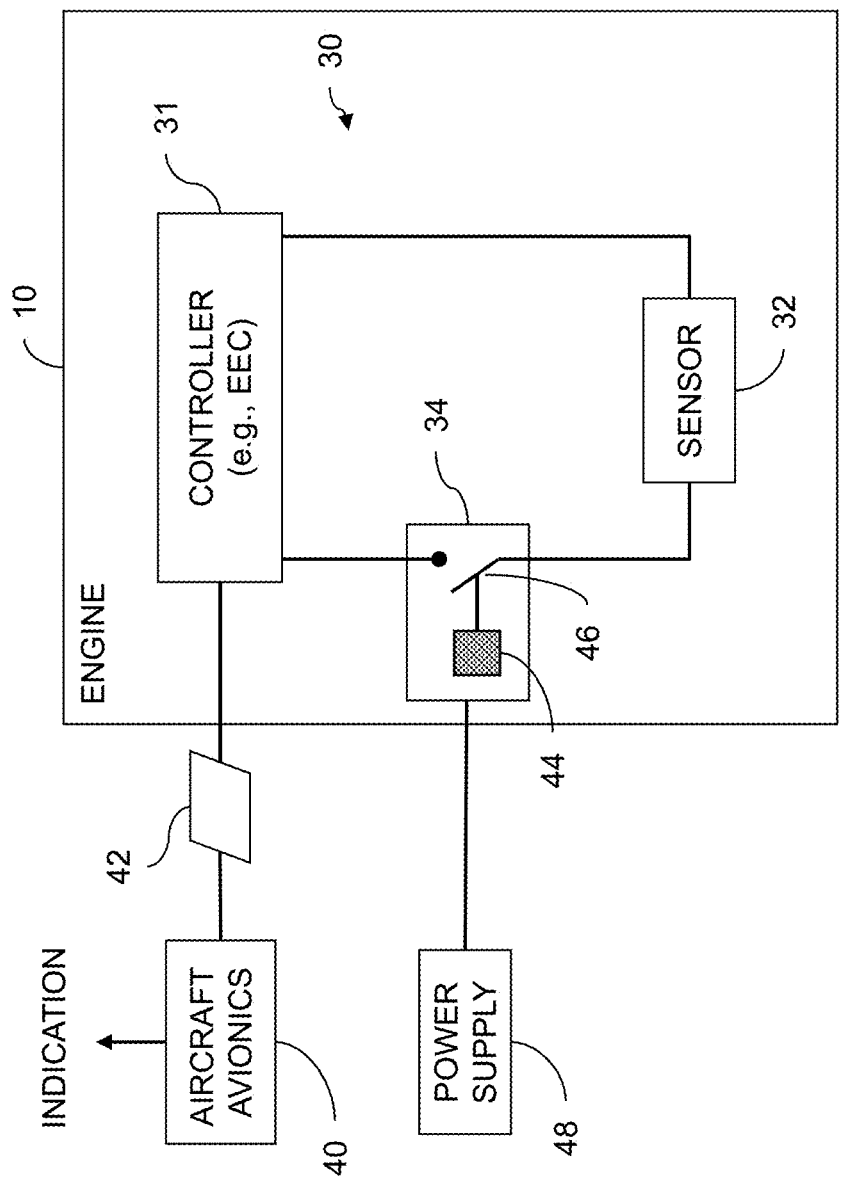
FIG. 2 is a schematic representation of the gas turbine engine of FIG. 1 showing more details of the apparatus for detecting the threshold condition.

FIG. 2 is a schematic representation of turbine engine 10 of FIG. 1 showing more details of apparatus 30 for detecting the threshold vibration condition. In some embodiments, vibration-sensitive trigger 34 may comprise a suitable vibration switch. Such vibration switch may of the type sold under the trade name IMI SENSORS (e.g., model number 686B02). Sensor 32 may be part of a sensing circuit including controller 31 and vibration-sensitive trigger 34 may be connected in series with sensor 32 as part of the same sensing circuit.

Vibration-sensitive trigger 34 may comprise vibration-sensitive element 44 operatively coupled to switch 46. Vibration-sensitive element 44 may comprise an accelerometer with associated circuitry/electronics. Switch 46 may be normally-closed so that the sensing circuit to which sensor 32 is part remains in a closed-circuit state when the vibration sensed by vibration-sensitive element 44 is at an acceptable level. However, when the vibration sensed by vibration-sensitive element 44 is excessive (i.e., has met or exceeded a predetermined threshold condition), vibration-sensitive trigger 34 may cause switch 46 to open and actively cause an open-circuit condition in the sensing circuit to which sensor 32 is part. Such open-circuit condition in the sensing circuit may intentionally disable sensor 32 and cause an apparent failure of sensor 32 to be detected by controller 31. In some embodiments, switch 46 may be actuated by a suitable relay that is activated upon vibration-sensitive element 44 having been subjected to vibration(s) having met the predetermined threshold vibration condition.

The predetermined vibration threshold condition may comprise one or a combination of vibration-related events that may be considered to be unacceptable or otherwise worthy of being detected by controller 31. In some embodiments, the vibration threshold condition may comprise a vibration amplitude value that is determined to be excessive for a normally-operating turbine engine 10 and that, if reached or exceeded even once, would cause vibration-sensitive trigger 34 to open switch 46. In some embodiments, the vibration threshold condition may comprise a vibration amplitude value that must be reached or exceeded a predetermined number of times before a suitably programmed or configured vibration-sensitive trigger 34 causes switch 46 to open. In some embodiments, the vibration threshold condition may comprise a vibration amplitude value that must be reached or exceeded for a predetermined period of time. In some embodiments, the vibration threshold condition may comprise a condition including a plurality of vibration amplitude values. In some embodiments, the vibration threshold condition may comprise a condition including one or more vibration amplitude values and one or more vibration frequency values.

The predetermined vibration threshold condition may be stored or built into vibration-sensitive trigger 34. In some embodiments, vibration-sensitive trigger 34 may be configured so that the predetermined vibration threshold condition may be adjustable and set based on the particular application. For example, vibration-sensitive trigger 34 may be programmable allowing the setting of the predetermined vibration threshold condition. Vibration-sensitive trigger 34 may be powered by a suitable power supply 48 of the aircraft to which turbine engine 10 is mounted.

In response to the predetermined vibration threshold condition being met, vibration-sensitive trigger 34 may actively cause the normally-closed switch 46 to open and thereby actively and intentionally cause a malfunction associated with the monitoring of the operating parameter by causing an open-circuit condition with the sensing circuit including sensor 32 and controller 31. This open-circuit condition in the sensing circuit may be perceived by controller 31 as an apparent failure of sensor 32 even though sensor 32 itself may not have failed. Depending on the type of sensor 32 and type of controller 31, the malfunction that has been intentionally caused by vibration-sensitive trigger 34 may comprise an open-circuit condition (e.g., infinite resistance) of the sensing circuit as perceived by controller 31. In some embodiments, the malfunction may comprise an interruption (i.e., absence) of one or more signals 38 (see FIG. 1) representative of the operating parameter being provided to controller 31.

While the specific example of a disturbance with the monitoring of the parameter described herein is an open-circuit condition causing an apparent failure of sensor 32 to be detected, it is understood that other types of disturbances could be introduced. For example, such disturbance could include an intentional modification to sensor signal 38 that would be detectable by controller 31. For example, such modification to sensor signal 38 could represent a sudden spike or drop in a value of the parameter, or other anomaly or additional signal introduced to and detectable in the signal, which would be indicative of a corresponding threshold vibration or other parametric condition having been met and intended to be interpreted as such. In this case, controller 31 or aircraft avionics 40 is programmed so that such interpretation may be made by controller 31 or aircraft avionics 40 and a suitable action automatically initiated and/or a suitable indication provided to the pilot of the aircraft and/or to an associated maintenance system or personnel. Alternatively, the intentional modification to sensor signal 38 may be configured to cause controller 31 to detect such modification as a fault or failure of sensor 32 and output signal 42 accordingly. In some embodiments, the intentional disturbance with the monitoring of the parameter may be temporary so as to notify that a threshold condition has been met but not otherwise disrupt or modify the signal 38 beyond such notification.

In some embodiments, it may be advantageous that the introduced disturbance be indicative of an apparent failure of sensor 32 (or other condition) so that the threshold condition may be detected without significant modifications to wiring/hardware and fault detection logic typically required for sensor 32. In the depicted example, the relative ease of installing vibration-sensitive trigger 34 using wiring/hardware already required for sensor 32 facilitates the use of vibration-sensitive trigger 34 in retrofitting HUMS into existing turbine engines or existing turbine engine designs or architectures. Furthermore, in situations where the same action (e.g., engine shut-down or other remedial action) is required in the case of both a failure of sensor 32 and in the case of a threshold vibration condition having been met, the same failure detection logic may be used for both cases without having to specifically distinguish between a real failure of sensor 32 or an apparent failure of sensor 32 caused by a disturbance introduced by vibration-sensitive trigger 34.

For example, controller 31 may detect the disturbance and generate output signal 42 for advising aircraft avionics 40 of a failure of sensor 32 in response to the disturbance in the monitored parameter. Aircraft avionics 40 may generate a suitable (e.g., visual, aural) indication such as a fault/warning message to alert a pilot of the aircraft or other appropriate individual responsible for the operation or maintenance of turbine engine 10. Upon receipt of this indication the pilot or other appropriate individual may initiate an action such as a shut-down of turbine engine 10 to prevent (e.g., further) damage to turbine engine 10, or schedule a suitable maintenance action, etc. Accordingly, the pilot or other individual may only need to know or be advised of what action to carry out when this indication is received without needing to know the specific reason behind the indication.

In some embodiments where controller 31 may be part of an EEC of turbine engine 10, such EEC may be configured to automatically cause some action to be initiated in response to the detection of the disturbance. For example, the EEC may automatically initiate a shut-down of turbine engine 10 upon detection of the disturbance in order to prevent (e.g., further) damage to turbine engine 10, or set a flag indicating a need for a maintenance action, etc.

Figure 3:
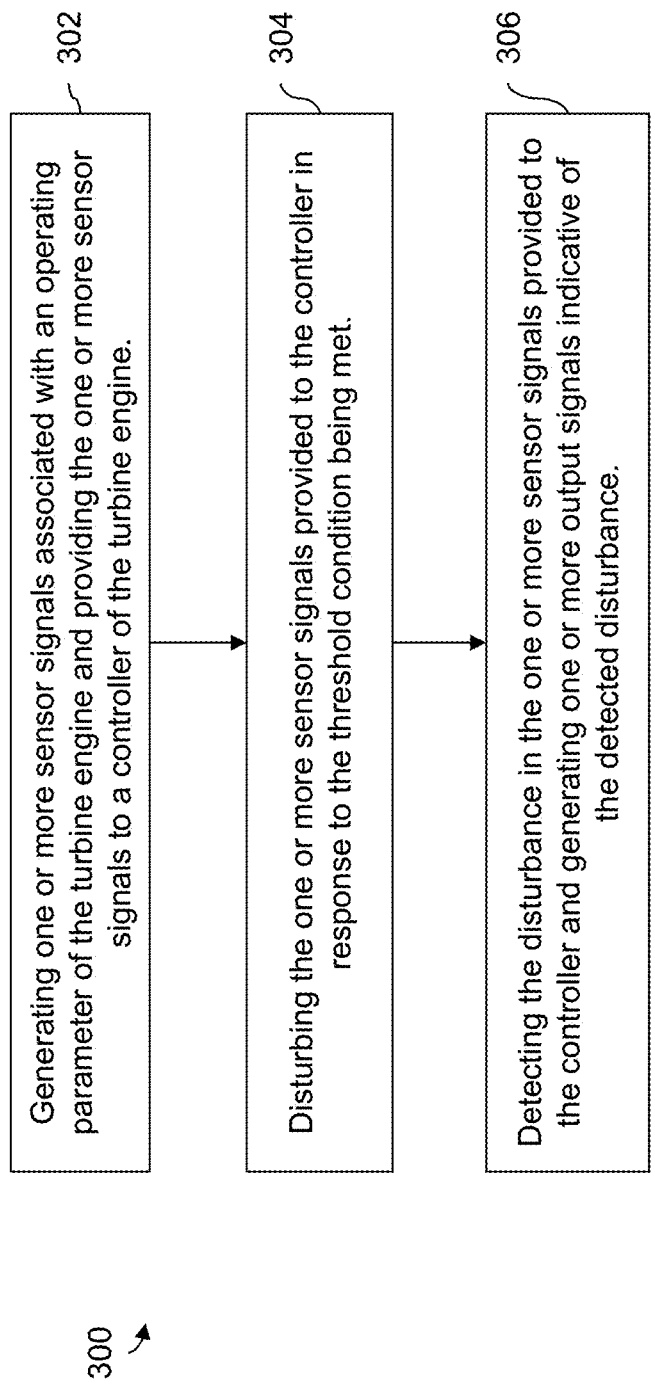
FIG. 3 is a flowchart illustrating a method for detecting a threshold condition associated with the operation of a gas turbine engine.

FIG. 3 is a flowchart illustrating a method 300 for detecting a threshold (e.g., vibration) condition associated with the operation of turbine engine 10. In some embodiments, method 300 may be carried out using apparatus 30 described above but it is understood that the performance of method 300 is not restricted to the exemplary embodiments of apparatus 30 disclosed herein. In some embodiments, method 300 may comprise: generating one or more sensor signals 38 associated with a (e.g., operating or environmental) parameter of turbine engine 10 and providing the one or more sensor signals 38 to controller 31 of turbine engine 10 (see block 302); disturbing the one or more sensor signals 38 provided to controller 31 in response to the threshold condition being met (see block 304); and detecting the disturbance in the one or more sensor signals 38 provided to controller 31 and generating one or more output signals 42 indicative of the detected disturbance (see block 306).

For example, the sensor data may be representative of a first parameter (e.g., speed) and the threshold condition may be associated with a second parameter (e.g., vibration) where the first parameter and the second parameter are different from each other.

In some embodiments of method 300, the threshold condition may be a threshold vibration condition.

In some embodiments of method 300, the parameter may be an operating speed (e.g., N1, N2) associated with turbine engine 10.

In some embodiments of method 300, the disturbance in the one or more sensor signals 38 provided to controller 31 may comprise an apparent failure of sensor 32 as perceived by controller 31 and/or by aircraft avionics 40.

In some embodiments of method 300, the disturbance in the one or more sensor signals 38 provided to controller 31 may be an interruption (i.e., absence) of one or more signals associated with the parameter being provided to controller 31.

Method 300 may comprise generating one or more output signals 42 indicative of a failure of sensor 32 in response to the detection of the disturbance.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. The present disclosure may be embodied in other specific forms without departing from the subject matter of the claims. As discussed previously, although the described example detecting a threshold vibration, it is understood that other suitable threshold conditions may be monitored and detected, for example such as threshold temperatures, pressures, displacements or speeds.

Also, one skilled in the relevant arts will appreciate that while the apparatus and methods disclosed and shown herein may comprise a specific number of elements/components, the apparatus and methods could be modified to include additional or fewer of such elements/components. The present disclosure is also intended to cover and embrace all suitable changes to and advances in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A gas turbine engine comprising:
   a compressor for pressurizing air;
   a combustor in which the compressed air is mixed with fuel and ignited for generating a stream of combustion gases;
   a turbine for extracting energy from the combustion gases;
   a controller of the gas turbine engine;
   a sensor operatively coupled to the controller to provide to the controller a sensor signal associated with a parameter other than vibration of the gas turbine engine; and
   a vibration-sensitive trigger mounted to the gas turbine engine for monitoring gas turbine engine vibration and configured to disturb the sensor signal when a threshold vibration condition is met;
   the controller configured to detect the disturbance in the sensor signal and generate one or more output signals indicative of the detected disturbance.

2. The gas turbine engine as defined in claim 1, wherein the disturbance comprises a detectible anomaly introduced into a speed sensor signal provided to the controller.

3. The gas turbine engine as defined in claim 1, wherein the disturbance comprises an interruption of a speed sensor signal provided to the controller.

4. The gas turbine engine as defined in claim 1, wherein the controller is configured to generate an output signal in response to the disturbance indicating an apparent failure of the sensor.

5. The gas turbine engine as defined in claim 1, wherein the sensor is a speed sensor and the parameter comprises a rotational speed of a shaft of the gas turbine engine.

6. The gas turbine engine as defined in claim 1, wherein the vibration-sensitive trigger comprises a vibration switch connected in series with the sensor.

7. An apparatus for detecting a threshold vibration condition associated with the operation of a gas turbine engine, the apparatus comprising:
- a controller of the gas turbine engine;
- a sensor operatively coupled to the controller to provide one or more sensor signals associated with an operating parameter other than vibration of the gas turbine engine to the controller; and
- a vibration-sensitive trigger configured to disturb the one or more sensor signals provided to the controller in response to the threshold vibration condition being met;
- the controller being configured to detect the disturbance in the one or more sensor signals and generate one or more output signals indicative of the detected disturbance.

8. The apparatus as defined in claim 7, wherein the disturbance comprises an interruption of the one or more sensor signals provided to the controller.

9. The apparatus as defined in claim 7, wherein the disturbance is indicative of an apparent failure of the sensor.

10. The apparatus as defined in claim 7, wherein the operating parameter comprises an operating speed associated with the gas turbine engine.

11. The apparatus as defined in claim 7, wherein the vibration-sensitive trigger comprises a normally-closed switch connected in series with the sensor.

12. The apparatus as defined in claim 7, wherein the sensor is part of a sensing circuit and the vibration-sensitive trigger is configured to cause an open-circuit condition in the sensing circuit.

13. The apparatus as defined in claim 7, wherein the vibration-sensitive trigger comprises a vibration switch.

14. The apparatus as defined in claim 7, wherein the sensor comprises a speed sensor and the vibration-sensitive trigger comprises a vibration switch connected in series with the speed sensor.

15. A method for detecting a threshold vibration condition associated with the operation of a gas turbine engine, the method comprising:
- generating one or more sensor signals associated with an operating parameter other than vibration of the gas turbine engine and providing the one or more sensor signals to a controller of the gas turbine engine;
- using a vibration-sensitive trigger to disturb the one or more sensor signals provided to the controller in response to the threshold vibration condition being met, the vibration-sensitive trigger mounted to the gas turbine engine and configured to monitor gas turbine engine vibration; and
- using the controller to detect the disturbance in the one or more sensor signals provided to the
- controller and generate one or more output signals indicative of the detected disturbance.

16. The method as defined in claim 15, wherein the operating parameter comprises an operating speed associated with the gas turbine engine.

17. The method as defined in claim 15, wherein the disturbance comprises an apparent failure of the sensor.

18. The method as defined in claim 15, wherein the disturbance comprises an interruption of the one or more sensor signals provided to the controller.

* * * * *